United States Patent [19]

Abe et al.

[11] Patent Number: 4,713,765

[45] Date of Patent: Dec. 15, 1987

[54] CONTROL SYSTEM FOR AN ENGINE HAVING AN AIR INTAKE PASSAGE

[75] Inventors: Tomoaki Abe, Nagoya; Hideya Fujisawa; Norio Omori, both of Kariya; Masumi Kinugawa, Okazaki; Katsunori Ito, Aichi; Susumu Akiyama, Kariya; Tiaki Mizuno, Toyota; Toshitaka Yamada, Nagoya, all of Japan

[73] Assignee: Nippondenso Co., Ltd., Kariya, Japan

[21] Appl. No.: 704,032

[22] Filed: Feb. 21, 1985

[30] Foreign Application Priority Data

| | | | |
|---|---|---|---|
| Feb. 24, 1984 | [JP] | Japan | 59-33595 |
| Mar. 7, 1984 | [JP] | Japan | 59-43701 |
| Mar. 7, 1984 | [JP] | Japan | 59-43702 |
| Apr. 11, 1984 | [JP] | Japan | 59-72188 |
| Apr. 16, 1984 | [JP] | Japan | 59-76267 |

[51] Int. Cl.[4] .......... F02M 51/00; G01F 1/68

[52] U.S. Cl. .......... 364/431.05; 73/204; 73/118.2; 123/494; 364/510

[58] Field of Search .......... 364/431.05, 510; 123/494; 73/204, 118.2

[56] References Cited

U.S. PATENT DOCUMENTS

| | | | |
|---|---|---|---|
| 3,803,913 | 4/1974 | Tracer . | |
| 3,928,800 | 12/1975 | Strenglein . | |
| 4,334,186 | 6/1982 | Sasayama et al. | 73/204 |
| 4,357,830 | 11/1982 | Kohama et al. . | |
| 4,409,828 | 10/1983 | Kohama et al. . | |
| 4,587,842 | 5/1986 | Handtmann | 73/204 |

FOREIGN PATENT DOCUMENTS

| | | | |
|---|---|---|---|
| 51-64134 | 6/1976 | Japan . | |
| 55-57112 | 4/1980 | Japan . | |
| 55-104538 | 8/1980 | Japan . | |
| 56-24521 | 3/1981 | Japan . | |
| 0884462 | 12/1961 | United Kingdom | 123/494 |

*Primary Examiner*—Parshotam S. Lall
*Attorney, Agent, or Firm*—Cushman, Darby & Cushman

[57] ABSTRACT

A control system for an engine has a temperature sensitive element as part of a device for measuring the air flow in an air intake manifold to the engine. Further, a first pulse signal is generated, corresponding to the rotation of the engine, for controlling the setting of a flip-flop. A transistor is conducted in the set state of the flip-flop to supply a heating electric current to the element. The element supplied with the current is raised to the temperature that corresponds to the air flow in the manifold. When the temperature of the element is raised until the specified temperature difference to the air temperature (measured by a sub temperature sensitive element) is set, the temperature difference is detected by a comparator, and the flip-flop is reset by the detection signal. A pulse-shaped signal corresponding to the set state of the flip-flop is produced as a measurement output signal, supplied as one detection signal of the operating state of the engine to an engine control unit, and the current to the element is controlled to be supplied by the pulse-shaped signal.

12 Claims, 34 Drawing Figures

FIG. 4
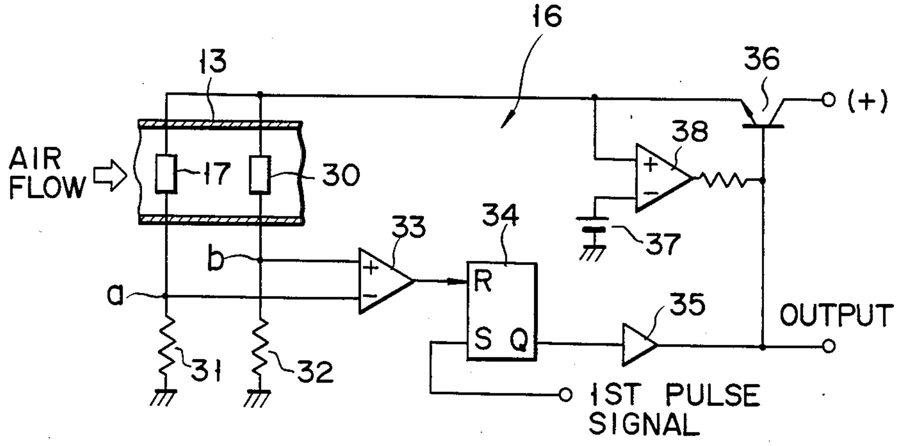
FIG. 5A
FIG. 5B
FIG. 5C
FIG. 5D
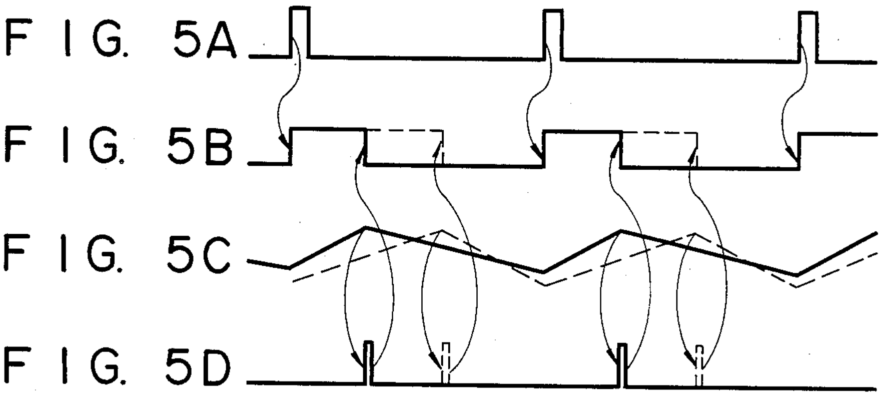

FIG. 15
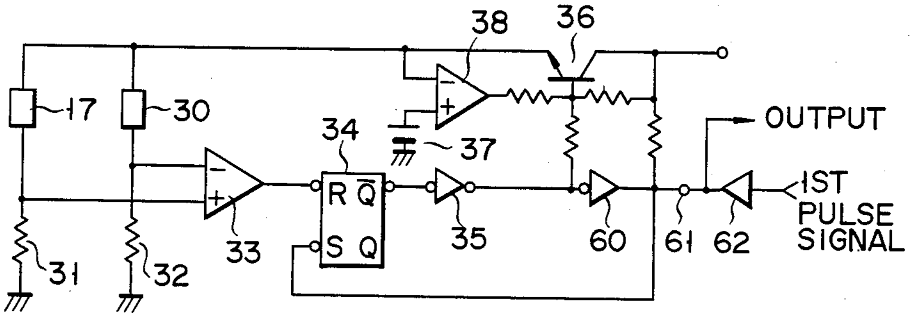
FIG. 16
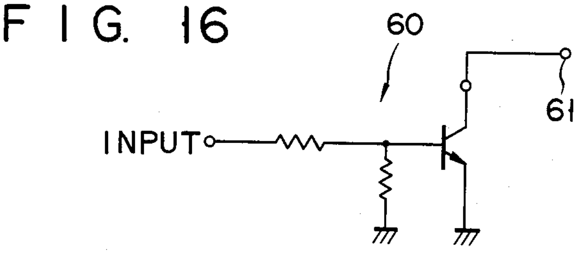
FIG. 17A
FIG. 17B
FIG. 17C
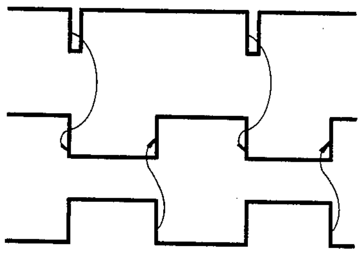

FIG. 18
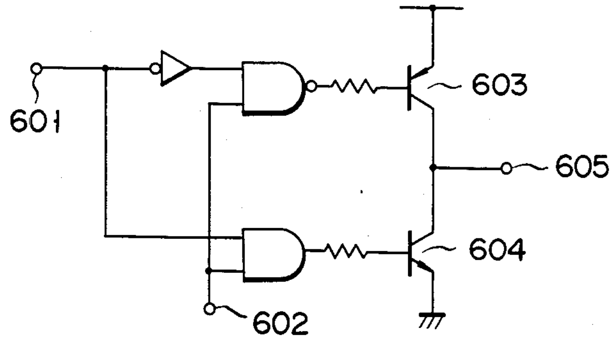
FIG. 19
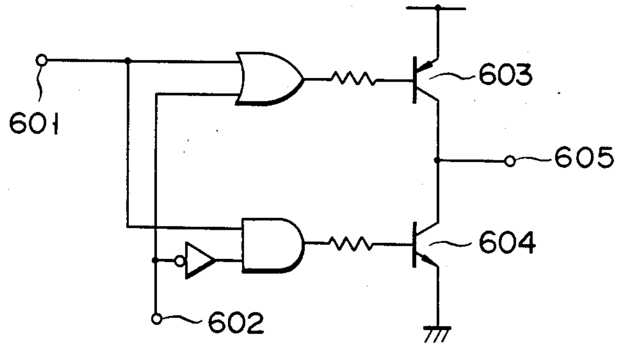
FIG. 20A
FIG. 20B
FIG. 20C
FIG. 20D
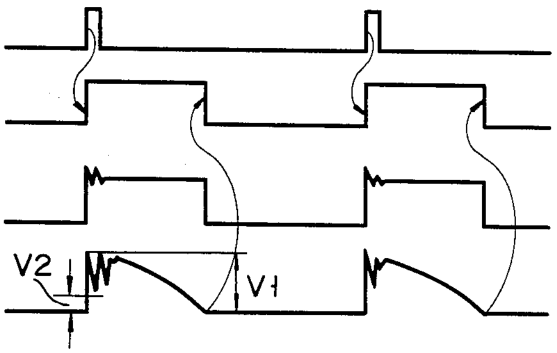
FIG. 21A
FIG. 21B
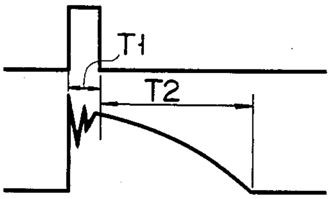

FIG. 22
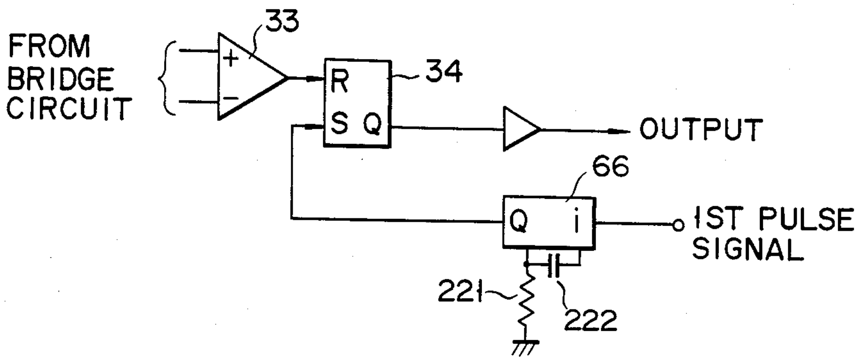
FIG. 23A
FIG. 23B
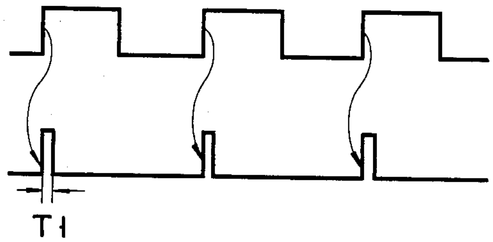
FIG. 24
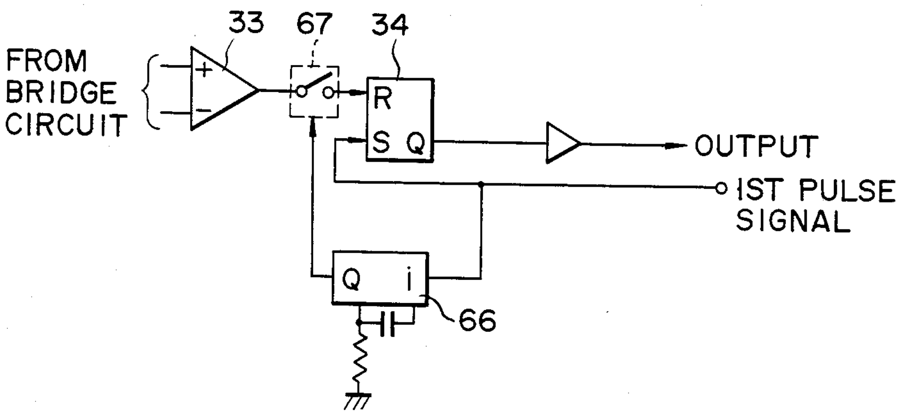

CONTROL SYSTEM FOR AN ENGINE HAVING AN AIR INTAKE PASSAGE

BACKGROUND OF THE INVENTION

The present invention relates to a control system for an engine having an air intake passage, and more particularly to an improvement in the detecting means for detecting the amount of air sucked into the engine. This is used as one of the means for detecting the operating state of an engine so as to obtain a more accurate air flow rate measurement signal, thereby controlling the operation of the engine more accurately.

When an engine is electronically controlled, it is necessary to always monitor its operating state. Monitoring means of the operating state, rotating speed detecting means, engine temperature detecting means, exhaust gas temperature detecting means, and throttle opening detecting means of the engine are presented, and as a direct relation to the operating state, measuring means of the air intake flow to the engine is presented.

As measurement detecting means of the air intake flow (used as an operating state detecting means of this engine), a heat type air flow sensor, for example, is used. This sensor is disposed in the intake manifold for supplying combustion air to the engine, has a heater controlled for heating, and is constructed to detect and measure the temperature changes of the heater.

The heater is set so that it is exposed to the air flow in the intake manifold, and the heat dissipating effect is variably controlled by the air flow. Therefore, the temperature of the heater corresponds to the air flow velocity in the intake tube, and the air flow in the intake manifold can be noted by monitoring the varying temperature of the heater.

More particularly, the heater constitutes a temperature sensitive element in which its resistance value varies in accordance with the temperature, and the element is constructed to control the heating electric current controlled in an analog manner with a constant temperature. In this case, since a heat dissipating effect corresponding to the air flow in the manifold is set by the element, the amount of electric current used for heating (heating electric current) increases so as to hold the temperature of the element constant when the air flow is increased. More specifically, the temperature state of the element is detected from the resistance value of the element, the amount of heating electric current to the element is controlled so that the temperature is maintained at a specified value, and the amount of air flowing in the manifold is calculated from the amount of the heating electric current.

However, in such an air flow measuring means, the temperature sensitive element set in an air flow to be measured is constructed to control an electric current controlled in an analog manner in a constant temperature state. When the air flow is, for example, varied 100 times, the heating, electric current value to the element varies approximately twice. Therefore, it is necessary to set offset processing means in a measurement output signal amplifier circuit to employ the measuring means for controlling an engine, and the control circuit thereof becomes complicated.

Further, when an engine is controlled by a microcomputer, it is necessary to convert an analog signal, corresponding to a heating current value from a sensor, into digital data and to supply it to an engine control circuit. Consequently, when the measuring means for obtaining the measurement output signal of such an analog state is employed, a highly accurate A/D converting operation must be executed, and an extremely accurate reference voltage power source for the A/D converter is required.

SUMMARY OF THE INVENTION

It is an object of the present invention to provide a control system, for an engine having an air intake passage, which can measure the intake air flow supplied to the engine when it is operating, which can measure the air flow with sensitivity but with a simple construction, and which has an intake manifold to effectively control the engine by such means as the control of the fuel injection system.

It is another object of the present invention to provide a control system, for an engine having an air intake passage, which can execute the measuring operation of the air intake flow so that it corresponds to the speed of the engine, calculate and output, for example, the amount of fuel needed to operate the engine, and execute the control of the engine in correspondence with the speed of the engine.

It is still another object of the invention to provide a control system for an engine having an air intake passage which can effectively supply a reference heating electric current to a temperature sensitive element, attain a highly accurate intake air flow measurement signal, effectively improve the accuracy of controlling the engine, and effectively remove noise signal components to execute a highly accurate intake air flow measurement.

According to an aspect of the present invention, there is provided a control system for an engine having an air intake passage which generates a signal corresponding to the operating state of the engine and hence a control pulse signal corresponding to the speed of the engine, and which controls the rise of a heating electric current supplied to a temperature sensitive element set in the intake manifold in response to the control pulse signal. The heating electric current is continuously supplied to the element until the temperature of the element reaches a certain specific temperature where the predetermined difference between it's temperature and the temperature of the air in the intake manifold is obtained, once this occurs, it interrupts the current supplied to the element.

Therefore, the length of time that the heating electric current is supplied to the temperature sensitive element determines the heat dissipating characteristic of the element, and the lengh of time determines the air intake flow in the intake manifold. In this case, the length of time that the heating electric current is supplied is used as a measurement output signal represented in a digital manner to be counted by a counter, this measurement output signal is directly supplied to an engine control unit composed of a microcomputer without using means for A/D conversion, and the unit can be used for controlling the engine with a highly accurate measurement signal.

Particularly, the measurement output signal, obtained by the above-described means is generated in correspondence to the speed of the engine, and in response to the timing of the fuel injection to the engine and the amount of fuel injected, thereby effectively controlling the operation of the engine.

BRIEF DESCRIPTION OF THE DRAWINGS

FIG. 4 is a circuit diagram for describing the measuring means;

FIGS. 5A to 5D are waveform diagrams for describing the operation states of the measuring means;

FIG. 15 is a circuit diagram showing the fifth example of the measuring means;

FIG. 16 is a view showing an open collector buffer circuit used in the measuring means;

FIGS. 17A to 17C are signal waveform diagrams for describing the operation of the above-described examples;

FIGS. 18 and 19 are views showing examples of a tri state buffer circuit;

FIGS. 20A to 20D are waveform diagrams describing the vibration noise contained in a signal generated from the measuring means;

FIGS. 21A and 21B are waveform diagrams describing the states of vibration noise;

FIG. 22 is a circuit diagram for describing the seventh example for removing the noise;

FIGS. 23A and 23B are signal waveform diagrams for describing the operation of the above examples; and FIG. 24 is a circuit diagram for describing other methods for removing the noise.

DETAILED DESCRIPTION OF THE PREFERRED EMBODIMENTS

The present invention will now be described in more detail with reference to the accompanying drawings.

Figure 1:
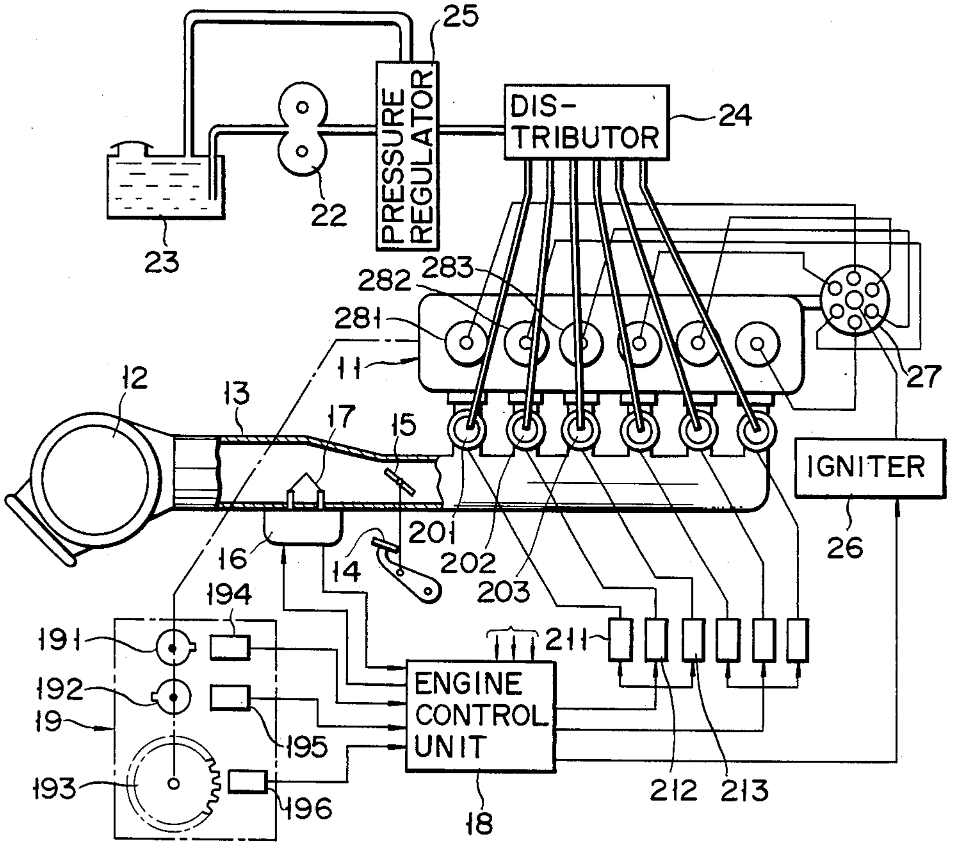
FIG. 1 is a view for describing the construction of a control system for an engine having an air intake passage of a first embodiment according to the present invention.

FIG. 1 shows a control system of an engine 11 for electronically controlling the amount of fuel injected in accordance with the operating state of the engine. Air to the engine 11 is sucked through an air intake manifold 13, from an air filter 12, to the engine 11. The amount of air is controlled by a throttle valve 15 driven and controlled by an accelerator pedal 14. A temperature sensitive element 17 which is part of a heat type air measuring device 16 is set in the manifold 13. The element 17 is composed of a heater made of platinum wire having temperature characteristics controlled for generating heat by an electric current and varying in its resistance value in accordance with the temperature. A measurement output signal from the measuring device 16 is supplied to an engine control unit 18 which includes a microcomputer. The heating electric current of the element 17 is controlled by a command from the control unit 18.

An output signal from a rotating speed sensor 19 for detecting the speed of the engine 11, and, not shown in FIG. 1, a coolant temperature detection signal, exhaust gas temperature detection signal, and an air-to-fuel ratio detection signal of the engine 11 are also supplied to control unit 18 as the operating state detection signals of the engine 11. The amount of fuel injected for the operating state of the engine 11 at that time is calculated on the basis of these detection signals, and supplied as a fuel injection time setting signal to fuel injectors 201, 202, . . . set in the cylinders of the engine 11.

In this case, signals for respectively setting the amounts of fuel supplied to the injectors 201, 202, . . . are formed in pulse-shaped signals set in a schedule. Data corresponding to the lengths of time of the signals are temporarily stored and set in the respective registers 211, 212, . . . to be stabilized to control the opening of the injectors in the range of the length of time, thereby controlling the amount of fuel injected in accordance to the length of time.

The rotating speed sensor 19 has cams 191, 192 coaxially driven rotatably with the engine 11, and a rotating angle detecting rotary plate 193 having a number of teeth, electromagnetic pickups 194 to 196 set opposite and corresponding to the cams 191, 192 and the plate 193 so that an angle signal corresponding to the specified rotating angle of the engine 11 and pulse-shaped signals for detecting and counting the further specified rotating angle positions are picked up from the pickups 194 to 196.

Fuel collected from a fuel tank 23 by a fuel pump 22 is distributed through a distributor 24 to the unit injectors 201, 202, . . . set to the cylinders of the engine 11. Here, the pressure of the fuel supplied to the distributor 24 is controlled in a constant state by a pressure regulator 25, and the amount of fuel injected is accurately controlled by the length of time the injector is open.

The engine control unit 18 also applies a command to an igniter 26, distributes ignition signals through a distributor 27 to ignition coils 281, 282, . . . respectively provided at the cylinders of the engine 11, and executes the control of the ignition timing adapted for the operation of the engine 11.

Figure 2:
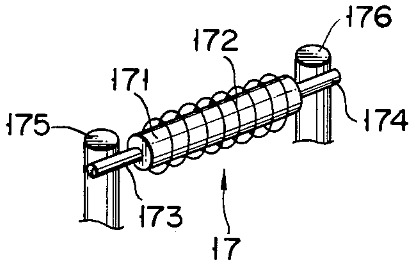
FIGS. 2 and 3 are views showing examples of the constructions of temperature sensitive elements used in the construction of an amount-of-intake air flow measuring means used in the above embodiment.

FIG. 2 shows the temperature sensitive element 17 used in the measuring device 16 employed in the control system for the engine described above. A platinum resistance wire 172 is wound as a resistance wire, having temperature characteristics, onto a ceramic bobbin 171. Shafts 173, 174 made of a good conductive material are projected as supporting shafts from both ends of the bobbin 171 to connect both ends of the wire 172 to the shafts 173, 174. The shafts 173, 174 are respectively supported by pins 175, 176 made of a conductive material, and a heating electric current is supplied through the wire 172 to the pins 175, 176. The wire 172 of the element 17 thus constructed is set to be exposed to the air flow in the manifold 13.

Figure 3:
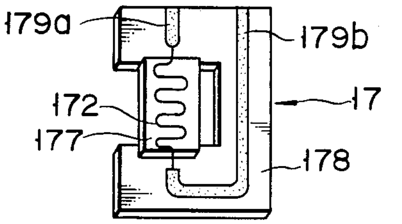

FIG. 3 shows another example of the element 17. A resistance wire 172, which is to become a heat generator, is formed by a printed circuit on a membrane 177 made of an insulator. The membrane 177 is supported by a supporting substrate 178 made of an insulator, wiring circuits 179*a*, 179*b* to be connected to the wire 172 are printed on the substrate 178, and a heating electric current is supplied through the circuits to the wire 172.

FIG. 4 shows a circuit diagram of the measuring device 16 used as described above. A temperature sensitive element 17 is fixedly set as a heater in an air intake manifold 13, and a sub temperature sensitive element 30 is also fixed upstream of the element 17 in the manifold 13. The element 30 is composed of a resistance wire (such as a platinum wire) in the same manner as the above-described element 17. The resistance value is set corresponding to the temperature of air passing through the manifold 13, and the wire is used as an air temperature measuring means. Fixed resistors 31 and 32 are respectively connected to the elements 17 and 30, and a bridge circuit is composed of the resistors 31, 32 and the elements 17, 30.

Connecting points a and b are for connecting the elements 17 and 30 to the resistors 31 and 32 respectively as the output terminal of this bridge circuit and are connected to the input terminal of a comparator 33, which detects the varying temperature of the element 17. In other words, a heating electric current is supplied to the element 17, and when its temperature rises to the point where the difference between its temperature and that of the air is the same as the predetermined specified temperature difference (detected by the element 30), an output signal from the comparator 33 rises.

The output signal from the comparator 33 is supplied as a reset command signal to a flip-flop 34. This flip-flop 34 is controlled to be set by a first pulse signal generated with every rotation of the engine 11, and the flip-flop 34 is maintained in the set state during a period from the first pulse signal to a second pulse signal corresponding to the output from the comparator 33.

The output signal generated from the comparator 33 when the flip-flop 34 is in the set state is produced as an output signal through a buffer amplifier 35, and supplied to the base electrode of a transistor 36, which controls an electric current supplied to the bridge circuit which includes the elements 17 and 30. In other words, when the flip-flop 34 is in the set state, the heating electric current is supplied to the element 17. In this case, the voltage value of the current supplied to the element 17 is set as a reference.

The first pulse signal as shown in FIG. 5A is generated, for example, with every rotation of the engine 11 corresponding to the specified rotating angle of the engine 11. The flip-flop 34 is set by the first pulse signal, and the output signal of the flip-flop 34 rises as shown in FIG. 5B, the transistor 36 is controlled to be in the ON state by the output signal, and the current is supplied to the element 17. In other words, the temperature of the element 17 is gradually raised as shown in FIG. 5C after the flip-flop 34 is inverted to the set state and the current is raised. The temperature rising velocity of the element 17 is determined by the heat dissipating effect corresponding to the air flow velocity acted on the element 17.

When the temperature of the element 17 rises, so does its resistance value. When the potential at a point a of this bridge circuit falls to the state lower than the potential of a point b, the output signal from the comparator 33 rises as a second pulse signal as shown in FIG. 5D, thereby resetting the flip-flop 34.

More specifically, when the heating electric current, set to the reference, is supplied to the element 17, the temperature of the element 17 rises at a velocity corresponding to the amount of air flowing in the manifold 13, and the length of time from the set of the flip-flop 34 to the reset of the flip-flop 34 becomes proportional to the amount of air flow.

In other words, the length of time of a period that the flip-flop 34 is set becomes a function of the intake air flow, the length of time of the pulse-shaped signal generated from the set of the flip-flop 34 to the reset of the flip-flop 34 becomes an air flow measurement signal, which is produced as an output signal of the measuring device and supplied to the engine control unit 18.

In the measuring device as described above, the element 17 is controlled to be heated by the time length signal. Therefore, the varying state of the output signal to the variation in the amount of air flow can be increased as compared with the case that the heating electric current is continuously supplied and set. Since the state of the output signal is a pulse-shaped signal format and the measured value is represented by the length of time, the output signal can be simply converted to digital data by counting the clock pulses. Further, the output signal, which is set by the length of time and the amount of air flow, is generated in a period corresponding to one rotation of the engine 11. In other words, the air flow measurement signal used to calculate the amount of fuel to be supplied to the engine is generated with every rotation of the engine 11. Therefore, the control of calculating the amount of fuel to be injected can be executed, so that it most closely matches the operating state of the engine 11.

Figure 6:
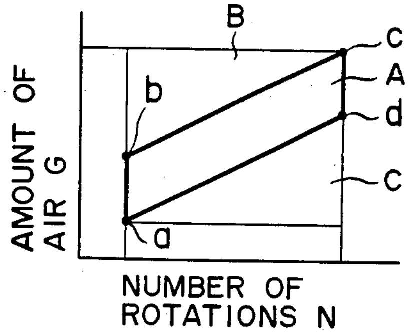
FIGS. 6 and 7 are graphical diagrams respectively showing the relationship between the number of rotations of the engine and the amount of air, and between the length of the pulse of a measurement output signal and the amount of air.

When the operating range of the engine 11 is observed in a relationship between the number of rotations N of the engine 11 and the amount of air flow, it becomes as shown in FIG. 6. In FIG. 6, reference character a designates an idling state, reference character b designates an idling full load state, reference character c designates the maximum number of rotations in a full load state, and reference character d designates the maximum number of rotations in a racing state. The interior A of a quadrangle designated by the a to d is the acutally usable range of the engine, and the outsides B and C of the quadrangle are meaningless in the ordinary usable range.

Figure 7:
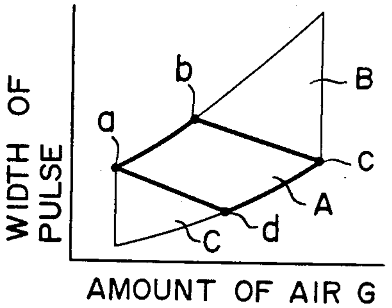

FIG. 7 shows the relationship between the length of time o, the output pulse signal of the measuring device 16 and the actual amount of air flow. The points a to d and the ranges A to C correspond to those in FIG. 6. The unnecessary ranges B and C are those in which the powers of the engine are large and small, and critical values cannot be measured in these ranges, but a wide range of air flows can be measured. Even when the output signal is converted into digital data, the resolution is deteriorated only extremely rarely in the high rotation low load range designated by d, which is of no problem since this point is not required particularly for the measuring control accuracy.

When the output signal of such a pulse state is attained, the integrated value of one pulse period of the signal is outputted. When considering this point, the measurement output signal is generated in the state corresponding to the rotating state of the engine. Therefore, the influence of the air intake pulsation caused by the opening and closing of the engine intake valves can be remarkably reduced.

In the embodiment described above, the measuring operation is executed in a period corresponding to the rotating state of the engine 11. However, this may correspond to the operating state of the engine 22. For example, the measuring period may be set corresponding to the injection timing of fuel which is controlled in relation to the engine rotation. When thus set, the average measuring output in the injection range can be attained even when the injection period is altered, and the amount-of-air flow measuring operation can be executed in the state adapted for the operating state of the engine.

Figure 8:
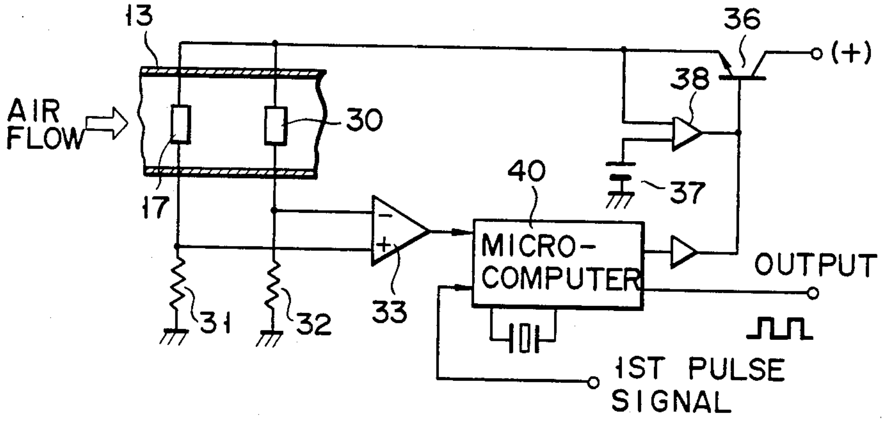
FIGS. 8 and 9 are views respectively showing the constructions of the second and third examples of the measuring means.

FIG. 8 shows the second example of the measuring device 16. This device is constructed so that an output signal from a comparator 33 is supplied to a 1-chip microcomputer 40. A first pulse signal corresponding to the operating state of the engine is supplied to the microcomputer 40, and a constant-voltage circuit which has a transistor 36, a differential amplifier 38 and a reference power source 37 is controlled by the microcomputer 40.

More particularly, the signal inputted from the comparator 33 to the microcomputer 40 is as shown in FIG. 5D, and the microcomputer 40 measures the interval between the input signal from the comparator 33 and the first pulse signal. Then, the length of time corresponding to the length of the pulse of the pulse-shaped signal as shown in FIG. 5B is measured, for example, by means for measuring a clock pulse.

Therefore, the output signal from the microcomputer 40 is not the pulse signal controlled in the length of the pulse as shown, in FIG. 4, but is produced as data converted from a serial data to binary data, and transmitted to the engine control unit 18. Or, it may be converted to a signal such as the air flow data, or the fundamental amount of fuel injection data by calculating in the microcomputer 40 and processing a table lookup.

Figure 9:
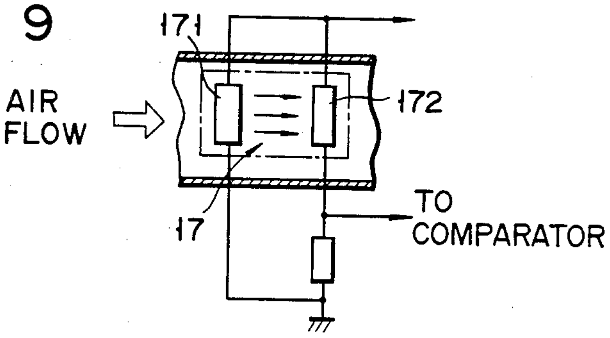

The element 17 used in the above-described example is constructed as a heat generating element having temperature-resistance characteristics by itself. However, the element 17 may be composed in combination with a heat generating element 171 for generating heat by the heating electric current as shown, in FIG. 9 and a heat sensitive resistance element 172 having temperature-resistance characteristics, which may be constructed so that both are set in such a manner that the element 172 is controlled to be heated by the element 171.

When the amount of intaken air flowing in the manifold 13 is measured by means shown in FIGS. 4 and 8, it has been described that the rise of the heating electric current to the element 17 was controlled in accordance with the first pulse signal generated at a period corresponding to one rotation of the engine and the period of measuring the amount of air flow was set. However, as the engine 11 varies its rotating speed between 500 to 10000 rpm, the measuring period varies very largely with respect to the variation in the rotating speed of the engine, so that it becomes difficult to execute a stable air flow measuring operation at all times. Further, when the measuring period is extremely short, it is difficult to maintain resolution and measuring accuracy.

Figure 10:
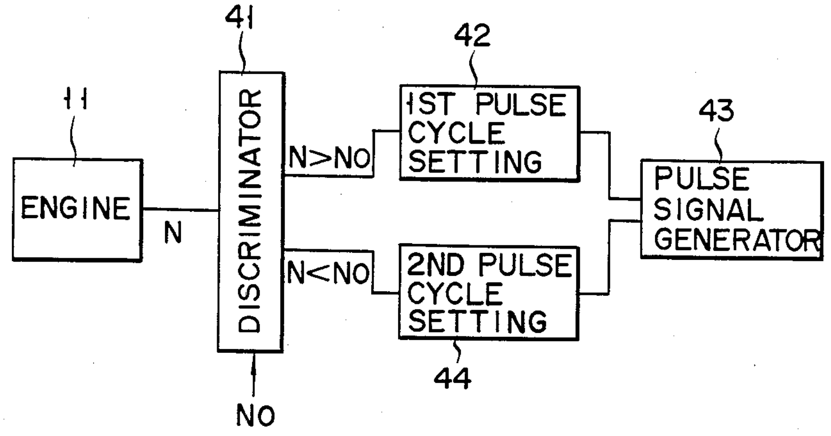
FIG. 10 is a view of the construction for describing the fourth example of the measuring means to explain first pulse signal generating means.

FIG. 10 shows the construction of a first pulse signal generation controller for setting the measuring period by considering the above-described points. In other words, a rotating speed signal N generated at every rotation of the engine 11 is supplied to a number-of-rotation discriminator 41. This discriminator 41 sets therein a reference value N0 of the number of rotations of the engine, discriminates the first state of "N>N0" and the second state of "N<N0" by comparing the detected number of rotations N with the reference value N0, and outputs it. When the discrimination output of the first state is generated from the discriminator 41, the discriminator 41 applies a command to a first pulse cycle setter 42 to divide the number of rotations N of the engine, in frequency, and to generate a period signal corresponding to the signal attained as the result. Then, the discriminator allows a pulse signal generator to generate a first pulse signal corresponding to the period divided in frequency from the rotation signal N.

When the discriminator 41 discriminates the second state, the discriminator 41 applies a command to a second pulse cycle setter 44. The setter 44 generates a period signal corresponding to the period of the rotation signal N, and allows the pulse signal generator 44 to generate the first pulse signal of the period corresponding to the number of rotations N of the engine.

More particularly, when the number of rotations N of the engine 11 is in a state lower than the set reference number of rotations N0, the pulse signal generator 43 generates the first pulse signal corresponding to the rotating period of the engine 11, thereby executing the measuring operation for controlling the supply of the heating electric current to the temperature sensitive elements. When the rotating speed of the engine 11 rises so that the period of the number-of-rotation detection signal becomes short, the signal N is divided in frequency to be converted into a signal having a long period, and the generator 43 generates the first pulse signal corresponding to the period of the converted signal.

Figure 11:
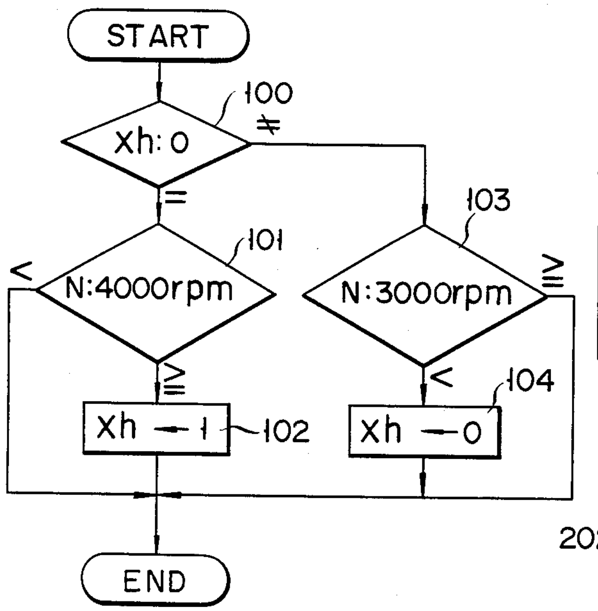
FIGS. 11 and 12 are flowcharts describing the operating states of the pulse signal generating means.

FIG. 11 shows a flowchart of the flow of the first pulse signal generating control state for controlling the measuring operation described above. In step 100, the state of a frequency dividing flag Xh is first discriminated. When the flag Xh is judged as "0" in step 100, the control flow is advanced to step 101. In step 101, the number of rotations N of the engine 11 at that time is compared with 4000 rotations to discriminate the state of the engine at that time. When the number of rotations of the engine at that time is judged to be smaller than 4000 rotations, the control flow is finished as the frequency dividing flag Xh remains "0". When the number of rotations N is judged to be equal to or larger than 4000 rotations, the control flow is advanced to step 102, the flag Xh is converted to "1", and finished.

When the flag Xh is judged to be "1" in step 100, the control flow is advanced to step 103 to discriminate in which state the number of rotations N of the engine is with respect to 3000 rotations. When the number of rotations N is judged to be smaller than 3000 rotations, the control flow is advanced to step 104, the flag Xh is converted to "1", and finished. When the number of rotations N is judged to be equal to or larger than 3000 rotations in step 103, the flow is finished as it is.

Figure 12:
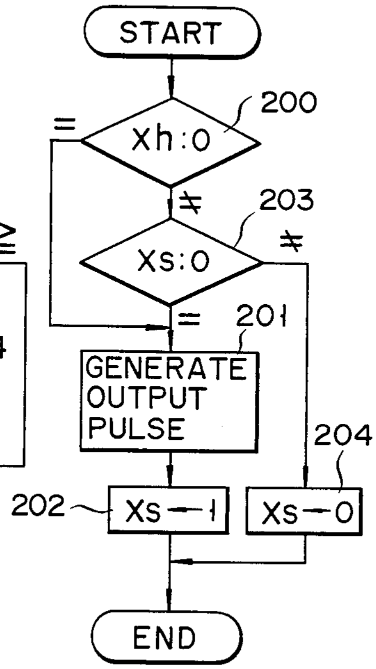

FIG. 12 shows the process of generating the first pulse signal for executing the measuring operation corresponding to the frequency dividing flag Xh to first discriminate the state of the flag Xh in step 200. In step 200, when the flag Xh is judged to be "0", the control flow is advance to step 201, and the signal generated corresponding to one rotation of the engine 11 is outputted as the first pulse signal as it is. Thereafter, in step 201, a skip flag Xs is set to "1" and finished.

When the flag Xh is judged to be "1" in step 200, the control flow is advanced to step 203 to discriminate the state of the skip flag Xs in step 203. When the flag Xs is judged to be "0" in step 203, the control flow is advanced to step 201 as it is, the first pulse signal corresponding to the rotating period of the engine 11 is outputted, and the flag Xs is converted to "1" in the next step 201. When the flag Xs is "1", the signal generated corresponding to one rotation of the engine 22 is skipped to eliminate the generation of the pulse signal, and the flag Xs is converted to "0" in the next step 204.

More specifically, the flag Xh is controlled to be set to correspond with the number of rotations of the engine 11, and when the flag Xh is "1", the flag Xs is controlled to be converted to "1" and "0" every time the detected signal, corresponding to the period of one rotation of the engine 11, is inputted. Then the output signal, to become the first pulse signal when the flag Xs is "0", is generated and the first pulse signal of the period divided by 2 in frequency from the rotation signal N is generated.

In the embodiment described above, the number of rotations of the engine is divided into high and low speed ranges, the period signal generated corresponding to the rotation of the engine in the high speed range is divided in frequency, and the first pulse signal for executing the measuring operation is set. However, a special relationship may be stored and set between the period signal N corresponding to the rotations of the engine and the first pulse signal period, the period stored on the basis of the number of rotations N of the engine may be read out, and the first pulse signal may be generated corresponding to the read out period.

Figure 13:
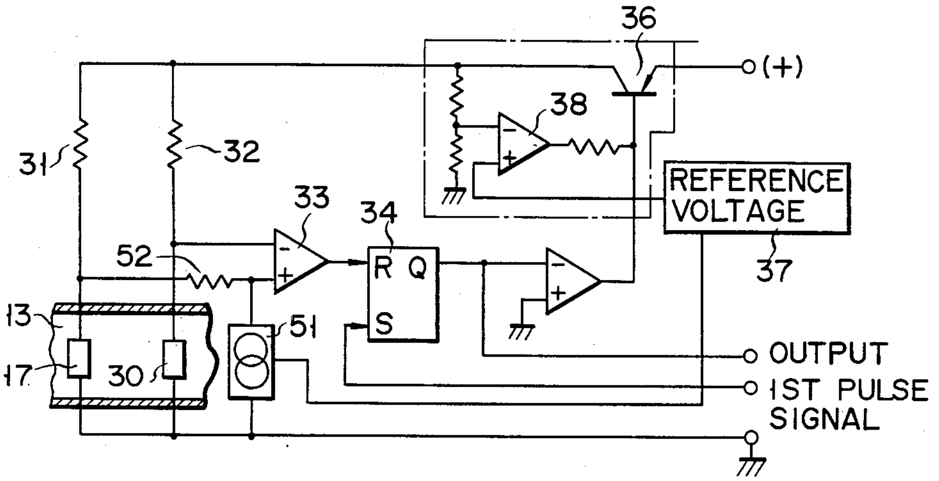
FIG. 13 is a circuit diagram for describing the fifth example of the measuring means.

FIG. 13 shows the fifth example of the measuring device employed in the present invention, wherein the said reference numerals as in the first example in FIG. 4 denote the same parts in the fifth example. In this example, the connecting point of a temperature sensitive element 17 to a resistance element 31 is connected through a resistor 50 to a comparator 33, and the input terminal of the comparator 33 is grounded through a constant-current circuit 51. In other words, the circuit 51 operates to determine the value of the temperature control of the element 17.

Figure 14:
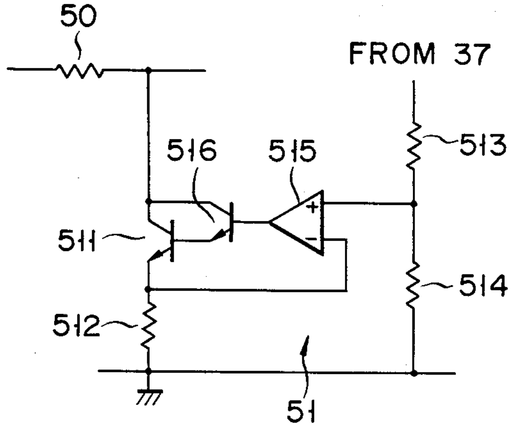
FIG. 14 is a circuit diagram showing an example of a constant current circuit used in the measuring means.

The constant-current circuit 51 is connected to the output side of the resistor 50 as shown in FIG. 14, and the output side of the resistor 50 is grounded through a transistor 511 and a resistor 512. Further, the voltage from a reference voltage power source 37 for controlling the voltage state of a heating electric current supplied to the element 17 in a constant voltage state is divided via resistors 513 and 514 and detected, the divided reference voltage is compared by a comparator 515 with the voltage of the terminal of the resistor 512, i.e., the voltage corresponding to the current value flowed to the resistor 50, and the transistor 511 is controlled by a transistor 516 controlled by the compared output from the comparator 515. In other words, the reference power source of the circuit 51 is composed to commonly have the reference power source 37 for controlling the heating electric current at a constant voltage.

In the measuring device described above, it is an important condition to attain accurate measuring data to control the current supplied to the element 17 at a constant voltage. Therefore, the reference voltage power source 37 for executing the control of the constant voltage is required to be extremely accurate. Consequently, the device becomes very expensive.

However, in the embodiment described above, the constant-current circuit 51 is provided in the state for determining the control of the temperature of the element 17, and the reference voltage power source 37 is commonly used as the reference power source of the circuit 51. Then, output errors to the constant voltage control circuit of the current and the constant-current circuit 51 due to an error in the power source 37 can cancel each other.

In other words, even if the accuracy of the power source 37 is not sufficient, the accuracy of the measured output signal generated from the measuring device 16 can be sufficiently high.

In the measuring device 16 shown and described in the previous examples, the first pulse signal for instructing the measuring operation is generated corresponding to the signal for detecting the rotating state of the engine, and supplied to the measuring device 16. Therefore, a special signal line for coupling the first pulse signal to the measuring device 16 is necessary, and a terminal for inputting the pulse signal is also required.

However, since the measuring device 17 is always mounted in an environment in which a number of noises normally exist, i.e., in the engine room of an automobile, it is restricted in the disposition of the signal wires for instructing the measuring operation.

FIG. 15 shows an example constructed by considering the above-described points. When an output signal from a flip-flop 34 is produced as a measuring output through a buffer amplifier 35, the signal is outputted through a terminal 61 of an open collector buffer circuit 60, and supplied to the engine control unit.

Further, the terminal 61 is also used as an input terminal of the first pulse signal to the measuring device 16, the first pulse signal is supplied through an open collector buffer circuit 62 to the terminal 61, and supplied as a set command signal to a flip-flop 34. In the circuit in FIG. 15, the input/output is executed in a negative logic.

FIG. 16 shows a detailed circuit example of the buffer circuit 60. When the output is at a high level, the circuit 60 is constructed to have high impedance. The buffer circuit 62, to which the first pulse signal is supplied is also constructed with a circuit shown in FIG. 16.

In the measuring device shown in FIG. 15, the first pulse signal generated in the state corresponding to the rotation of the engine is inputted through the buffer circuit 62 to the terminal 61 to set the flip-flop 34. Then, the amount of air flowing in the intake manifold is measured in the same manner as the case described with reference to FIGS. 5A to 5D.

An output signal from the flip-flop 34 is supplied to the terminal 61 upon the inputting of the above-described first pulse signal, and the measuring output signal corresponding to the setting and resetting operations of the flip-flop 34 is produced through the buffer circuit 60. The flip-flop 34 is set when the output signal rises. Therefore, even when the output signal is supplied from the set command input to the flip-flop 34, it does not affect the operation of the measuring device.

The operating state of the example described above will be further described. Assume that the first pulse signal supplied to the buffer circuit 62 is in the state as shown in FIG. 17A, the flip-flop 34 is controlled to be set or reset in the states as shown in FIG. 17B, and the signal for controlling a transistor 36 is as shown in FIG. 17C.

In the embodiment described above, the buffer circuits 60 and 62 have been described as open collector types. However, these buffer circuits may also be constructed as a tri-state type.

FIG. 18 shows a tri-state circuit used as a buffer circuit 60. An input signal is supplied to an input terminal 601, and a control signal is supplied to a control terminal 602. Then, transistors 603 and 604 are reciprocally controlled corresponding to the level state of the control signal.

In other words, when the control signal is at a high level, the input signal is inverted to be presented at an output terminal 605. When the control signal is at a low level, the output terminal 605 has a high impedance.

When this circuit is applied to the device shown in FIG. 15, the input terminal 601 is connected to the terminal 602, and used as an input terminal.

FIG. 19 shows a tri-state circuit used as a buffer circuit 62. When a control signal to the control terminal 602 is at a low level, a signal coupled to the input terminal 601 is transmitted to the output terminal 605 as it is. When the control signal is at a high level, the output terminal 605 has a high impedance.

The embodiments described above will be further considered. Assume that the first pulse signal for controlling the flip-flop 34 is generated in the state shown in FIG. 20A, the flip-flop 34 is set by the signal to control a transistor 36, and a pulse-shaped heating electric current corresponding to the element 17 is generated as shown in FIG. 20B. In this case, the state of the current flowing to the element 17 and the resistance element 31 vibrates as shown in FIG. 20C by the distributed capacitance and the inductance on the wires for controlling and transmitting the current. The potential at the point of an input signal to the comparator 33 of the connecting point to the element 17 and the element 31 is proportional to that shown in FIG. 20C. Therefore, the input potential to the comparator 33 with the potential of the connecting point of the element 30 to the resistance element 33 as a reference also vibrates as shown in FIG. 20D. Further, the time constants for raising the potential at both input points of the comparator 33 from the difference of the impedances become different.

The varying length V1 of the waveform of FIG. 20D is a mere several mV according to the operating conditions, and when the peak value of the vibration of the waveform exceeds V1 so that the margin length V2 becomes zero, the comparator 33 judges that the temperature of the element 17 has reached the set temperature and interrupts the current and is therefore in error.

In order to effectively eliminate the occurrence of the above-described problem, the flip-flop 34 is constructed as a level trigger type, in such a manner that, in the state that an input signal exists in the set terminal, the flip-flop remains set even when a reset command signal is supplied to the resetting terminal of the flip-flop. Then, the length T1 of time to obtain an effective polarity of the first pulse signal, used for controlling the current, is set to a value larger than that of vibrating the current as shown in FIG. 21A.

In other words, the flip-flop 34 remains set irrespective of the output state of the comparator 33 during the length T1 of time, and the flip-flop 34 is controlled by the output of the comparator 33 in the period T2, the state for proving the output of the comparator 33. This means that the output of the comparator 33 is masked during the length T1 of time of the first pulse signal, and the air flow measuring operation is stably executed.

The first pulse signal having a predetermined pulse length may be set in this manner, but the pulse length T1 is set as it is to the lower limit value of the measuring output. Therefore, the length of the first pulse signal is desired to be as short as possible. However, a difficulty which might sometimes occur with using the first pulse signal having a short length T1 of time according to the environmental conditions such as the wire state used or the noise presenting state. The load to the heating signal generator increases.

FIG. 22 shows an example of means for generating the first pulse signal for controlling the heating of an electric current and considers the above-described points. An edge trigger type monostable multivibrator 66 is constructed to control the rise of the inputted first pulse signal at the edge, and the flip-flop 34 is controlled by the output signal set in the length of the pulse from the multivibrator 66.

In other words, when the first pulse signal as shown in FIG. 23A is generated, the output signal of the multivibrator 66 rises corresponding to the rising edge of the signal as shown in FIG. 23B, and the flip-flop 34 remains set during the length T1 of time set by a resistor 661 and a capacitor 662 for setting the time constant of the multivibrator 66.

FIG. 24 shows still another example of signal generating means for controlling the heating of an electric current. A switch circuit 67 is provided between a comparator 33 and a flip-flop 34, which is of an edge trigger type.

In this case, the switch circuit 67 may be composed of a digital switch circuit having in combination an analog switch and a logic circuit.

More specifically, in this circuit, the output of the comparator 33 is not transmitted to the flip-flop 34 for a predetermined period of time by the output signal of the multivibrator 66, and the masking operation is executed during the length T1 of time in the same manner as described above.

In addition, when the flip-flop 34 is composed of an edge trigger type with a preset terminal, the output of the multivibrator 66 may be supplied to the preset terminal of the flip-flop 34.

The present invention having been described may be modified so that the temperature sensitive element used as the heater is supplied with a constant current in place of a constant voltage.

What is claimed is:

1. A control system for an engine having an air intake passage, comprising:

- means for generating a first pulse signal at every predetermined angular rotation of said engine;
- means disposed in said air intake passage for generating heat in accordance with an electric current supplied thereto and for measuring the temperature of itself;
- means for detecting the temperature of air passing through said air intake passage;
- means for establishing a reference temperature in accordance with the air temperature detected by said air temperature detecting means;
- means for comparing the temperature of said heat generating means with the reference temperature established by said reference establishing means, said comparing means generating an output signal when the temperature of said heat generating means is higher than the reference temperature;
- means for generating a second pulse signal having a period starting from the first pulse signal and ending with an output of said comparing means indicating that the temperature of said heat generating means attains the reference temperature, the period of said second pulse signal being indicative of an amount of air sucked into said engine per the predetermined angular rotation of said engine;

means for supplying said heat generating means with the electric current during the period of said second pulse signal so that said heat generating means generates heat during said second pulse signal and dissipates heat thereafter; and means for supplying said engine with fuel in accordance with the period of said second pulse signal.

2. A control system according to claim 1, wherein said electric current supplying means includes:

a voltage source;

a reference voltage circuit for producing a predetermined reference voltage;

a transistor having a base connected to said second pulse signal generating means and an emitter-collector path connected in series with said voltage source and said heat generating means, said transistor being turned on in response to said second pulse signal to supply said heat generating means with a voltage from said voltage source; and a comparator connected to receive the voltage supplied to said heat generating means and the predetermined reference voltage of said reference voltage circuit, said comparator being further connected to the base of said transistor to control the turning on and off of said transistor in response to an output signal of said comparator so that the voltage supplied to said heat generating means is kept constant.

3. A control system according to claim 1 further comprising:

a reference voltage circuit for producing a predetermined reference voltage;

a resistor connected between said heat generating means and said comparing means; and a constant current circuit connected in parallel with said heat generating means and said resistor, and responsive to the reference voltage of said reference voltage circuit for regulating an electric current flowing through said resistor at a value proportional to the reference voltage, and wherein said current supplying means includes a constant voltage circuit connected to said reference voltage circuit for supplying said heat generating means with a constant voltage proportional to said reference voltage in response to the second pulse signal.

4. A control system according to claim 1, wherein said first pulse signal generating means includes:

a rotation detector for generating a rotation pulse at every predetermined angular rotation of said engine;

means for discriminating whether the rotational speed of said engine is above or belcw a predetermined speed, said discriminating means generating a first and second signal indicating that the rotational speed of said engine is below or above the predetermined speed, respectively;

means for dividing said rotation pulse into different frequencies in response to said second output signal of said discriminating means; and means for selecting either the rotation pulse or the frequency-divided rotation pulse as said first pulse signal in response to the first and second output signals of said discriminating means.

5. A control system according to claim 4, wherein the predetermined speed of said discriminating means is set to different values when the number of rotations of the engine is varied to rise and fall in such a manner that the predetermined speed when the number of rotations of the engine rises is set to a speed higher than the predetermined speed when the number of rotations of the engine falls.

6. A control system according to claim 1, wherein the first pulse signal generated from said first pulse signal generating means and the second pulse signal generated from said second pulse signal generating means are transmitted to and from said second pulse signal generating means, respectively, through a common signal line.

7. A control system according to claim 1, wherein said second pulse generating means includes means for preventing the inverting operation due to the output signal from said comparing means at a time interval specified once the said first pulse signal is raised.

8. A control system according to claim 7, wherein said second pulse generating means is set to the first state by said first pulse signal, and composed of a flip-flop inverted by the output signal from said comparing means to the second state, and said flip-flop is composed as a level trigger type so that said first state is maintained even if the output signal is generated from said comparing means in the state that said first pulse signal is presented.

9. A control system according to claim 8, wherein the length of said first pulse signal is set to the length of time specified to execute the prevention of the inversion of said second pulse generating means.

10. A control system according to claim 7, wherein means for preventing said inverting operation is composed of a switch circuit interposed between said comparing means and said second pulse generating means, and said switch circuit is set to open the length of time specified from the rising edge of said first pulse signal.

11. A control system for an engine having an air intake passage, comprising:

first resistance means, including a first resistor whose resistance value varies in accordance with the temperature of air passing through said air intake passage, for generating a first output signal corresponding to the resistance value of said first resistor;

second resistance means, including a second resistor positioned in said air intake passage and having a resistance value that varies in accordance with the temperature thereof, for generating a second output signal corresponding to the resistance value of said second resistor;

comparator means, connected to said first resistance means and said second resistance means, for comparing said second output signal with said first output signal to generate a third output signal when said second output signal reaches a level of said first output signal;

rotation detector means for generating a fourth output signal synchronously with the predetermined angular rotation of said engine;

pulse generating means for generating a fifth output pulse signal having a time width starting from said fourth output signal and ending with said third output signal, said fifth output signal being indicative of amount of air in said air intake passage per a predetermined rotation;

power control means for controlling a supply of electrical power to said second resistance means in response to said fifth output pulse signal so that said second resistor generates heat during the time width of said fifth output pulse signal and dissipates the heat after said fifth output pulse signal; and fuel control means for controlling the amount of fuel supply in accordance with the time width of said fifth output pulse signal.

12. A control system for an engine having an air intake passage comprising:

an electric power source;

a heater resistor positioned in said intake air passage for generating heat when an electric current is supplied from said power source, the resistance value of said heater resistor varying in accordance with the temperature thereof;

a first resistor connected in series with said heater resistor;

a sensing resistor positioned upstream said heater resistor in said intake air passage for sensing the temperature of air passing therethrough, the resistance value of said sensing resistor varying in accordance with the sensed air temperature;

a second resistor connected in series with said sensing resistor;

a comparator connected to a first junction between said heater resistor and said first resistor and a second junction between said sensing resistor and said second resistor, said comparator producing an output signal when a first signal developed at said first juntion reaches the level of a second signal developed at said second junction;

a rotation detector for generating a rotation pulse synchronously with the predetermined angular rotation of said engine;

switching means for switching on and off an electrical connection between said power source and said heater resistor in response to the rotation pulse of said rotation detector and said output signal of said comparator, respectively;

measuring means for measuring an interval of time from the rotation pulse to the output signal from said comparator; and fuel supply means for supplying said engine with fuel during an interval of time proportional to a measured interval of time.

* * * * *